United States Patent [19]
Kanota et al.

[11] Patent Number: 5,790,747
[45] Date of Patent: Aug. 4, 1998

[54] DIGITAL VIDEO SIGNAL RECORDING APPARATUS WITH SHUFFLING ACROSS AN ENTIRE HIGH DEFINITION IMAGE

[75] Inventors: Keiji Kanota, Kanagawa; Naofumi Yanagihara, Tokyo, both of Japan

[73] Assignee: Sony Corporation, Tokyo, Japan

[21] Appl. No.: 139,906

[22] Filed: Oct. 22, 1993

[30]    Foreign Application Priority Data

Oct. 31, 1992  [JP]  Japan ................... 4-316532

[51] Int. Cl.$^6$ .......................................... H04N 5/92
[52] U.S. Cl. .................... 386/123; 386/124; 360/32
[58] Field of Search ........................... 358/335, 310;
348/384, 420, 390; 360/32, 33.1, 8, 9.1;
H04N 5/76, 9/79, 5/92

[56]    References Cited

U.S. PATENT DOCUMENTS

| | | | |
|---|---|---|---|
| 4,811,123 | 3/1989 | Yoshinaka | 360/26 |
| 5,103,294 | 4/1992 | Aoki et al. | 348/411 |
| 5,237,424 | 8/1993 | Nishino et al. | 358/310 |
| 5,241,395 | 8/1993 | Chen | 358/433 |
| 5,257,107 | 10/1993 | Hwang et al. | 386/33 |
| 5,329,375 | 7/1994 | Juri et al. | 348/408 |

FOREIGN PATENT DOCUMENTS

| | | |
|---|---|---|
| 0 224 366 | 6/1987 | European Pat. Off. . |
| 0 499 303 | 8/1992 | European Pat. Off. . |
| 552049 | 7/1993 | European Pat. Off. . |

*Primary Examiner*—Andrew Faile
*Assistant Examiner*—Vincent F. Boccio
*Attorney, Agent, or Firm*—William S. Frommer; Alvin Sinderbrand

[57]    ABSTRACT

A serial data stream representing an image is divided into a plurality of data streams, which are selectively combined to form collected data streams that are respectively blocked, shuffled, orthogonally transformed, variable length encoded, and buffered to form encoded blocks restricted to a predetermined amount of data. The encoded blocks for each of the collected data streams are selectively combined to form channels of record data which are recorded by respective recording heads on tracks of a recording medium using a track shuffling process.

10 Claims, 15 Drawing Sheets

Fig. 2

| INPUT SIGNAL | 1125/60 (HIGH DEFINITION TV) | 1250/50 (HD-MAC) |
|---|---|---|
| SAMPLING FREQUENCY (MHz) (COLOR SIGNAL) | 44.55 (22.275) | 45.0 (22.5) |
| NUMBER OF SAMPLES/LINE | 1320 | 1440 |
| NUMBER OF EFFECTIVE SAMPLES/LINE (COLOR SIGNAL) | 1152 (576) | 1200 (600) |
| NUMBER OF EFFECTIVE SAMPLES/FRAME (COLOR SIGNAL) | 1040 (520) | 1152 (576) |

Fig. 6
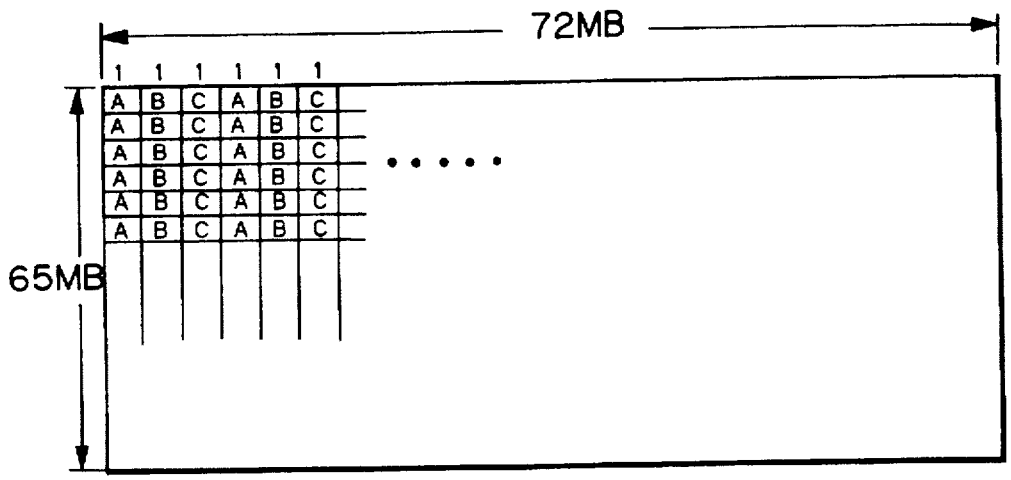
INPUT TO ENCODER BLOCKS 8A, 8B, AND 8C
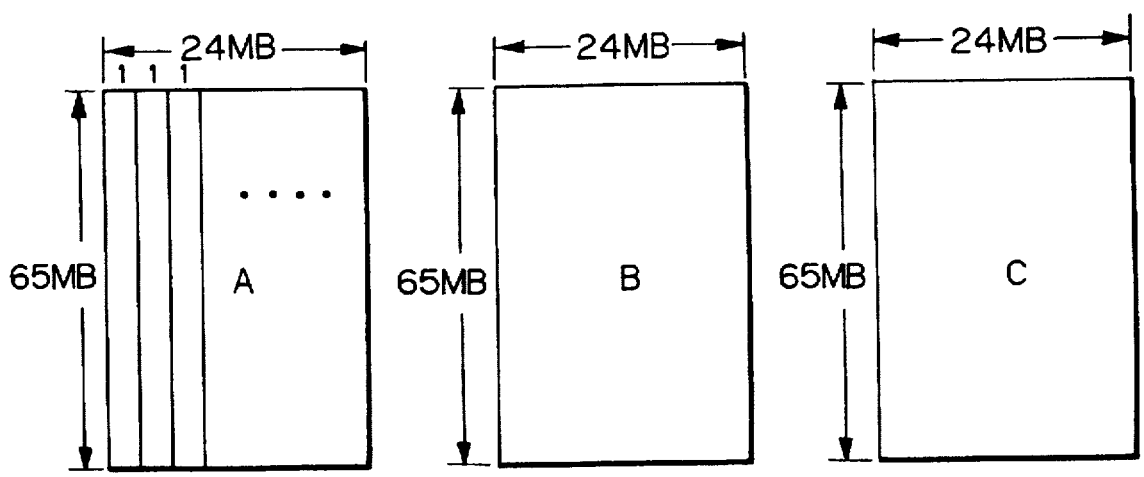

ENCODED BLOCK A

ENCODED BLOCK A

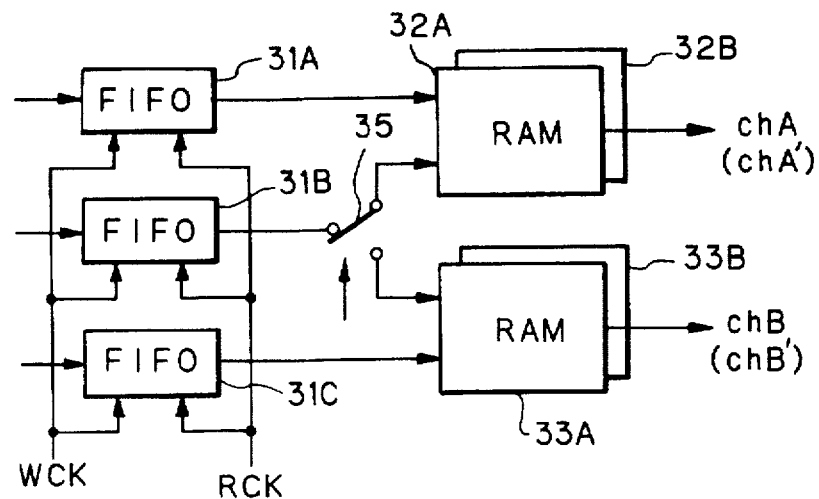

DIGITAL VIDEO SIGNAL RECORDING APPARATUS WITH SHUFFLING ACROSS AN ENTIRE HIGH DEFINITION IMAGE

BACKGROUND OF THE INVENTION

The present invention relates to compression of a high resolution digital video signal, and, more particularly, is directed to compressing and encoding a high resolution digital video signal and recording the encoded signal on a magnetic tape.

A digital video signal is usually compressed in an encoder before being recorded on a magnetic tape. Popular compression techniques often orthogonally transform the original digital video signal to produce blocks of coefficient data which are easier to compress than the original digital video signal.

A widely used type of orthogonal transformation is the discrete cosine transform (DCT). The original digital video signal is segmented into blocks of 8 pixels×8 lines, and these pixel data blocks are DCT transformed into 8×8 blocks of coefficient data which are encoded using a variable length code such as run length Huffman encoding that produces a variable amount of encoded data. Then, in a frame segmenting process, the encoded data, forming a data portion, is combined with a synchronization signal and an ID signal to form sync blocks each having a predetermined length. The sync blocks are then recorded, such as on a magnetic tape or a disc shaped recording medium, or transmitted.

Conventional digital video signal recorders, such as VTRs and disc recording apparatus, record video data for one field or one frame on a predetermined plurality of tracks on the recording medium. To ensure that the amount of variable length encoded data for one field or frame can fit into the predetermined plurality of tracks for that field or frame, a buffering process is performed during encoding of the original video signal to decrease the amount of variable length encoded data to a predetermined amount. The buffering process is performed for an amount of encoded data referred to as a buffering unit, which is usually substantially less than the amount of data representing a field or frame, so as to reduce the required memory capacity in the encoder.

Also, before the encoded data is recorded, a shuffling process is performed for each image (field or frame) in which the order of the encoded data is changed, corresponding to changing the spatial position of the original data, to reduce the noticeability of an error, such as a scratch on the tape, in the reproduced image. That is, the effect of the shuffling process is to disperse a burst error introduced during recording or reproduction.

Data for a standard resolution (SD) video signal, such as a 525/60 system, is typically transmitted or recorded at a rate such as 25 Mbps.

A high definition (HD) video signal typically has twice as many pixels in the horizontal direction as the SD signal, and twice as many scanning lines in the vertical direction as the SD signal. Thus, the amount of information required to represent the HD signal is approximately four times as much as is required to represent the SD signal.

A SD signal digital VTR using conventional rotary heads and magnetic tape can be modified for use as a HD signal digital VTR by doubling its tape speed and using a multi-track system which simultaneously forms two tracks for recording two channels of information. However, the data rate of the digital HD signal is still too high for typical encoders, particularly if it is desired to use the SD signal encoding hardware.

Conventional solutions to this problem divide an image into N strips in, for example, the horizontal direction. Physically, such solutions correspond to dividing one serial data stream for the digital HD signal into N parallel data streams, each having a data rate of 1/N times the original HD signal data rate. Each data stream is then separately encoded by block segmentation, orthogonal transformation, variable length coding and the above described buffering process. However, the shuffling process is performed for each of the N strips, rather than for the entire image, which reduces its effectiveness in dispersing burst errors.

The other effects of the shuffling process are related to the buffering process. A result of the shuffling process is to average the data in each of the buffering units. Large differences in compression ratios in the buffering units are not noticeable in a reproduced image. However, restricting the shuffling portion to one of the N strips of the image adversely affects the averaging of the generated data.

Moreover, when the serial-to-parallel converting process produces N streams of data, for example N=3, rather than two, these data streams must be somehow converted into two record channels for each of the two tracks simultaneously formed during recorded.

OBJECTS AND SUMMARY OF THE INVENTION

Therefore, an object of the present invention is to provide a digital video signal recording apparatus which avoids the aforementioned disadvantages of the prior art.

Another object of the present invention is to provide a digital video recording apparatus which converts a digital video signal to a plurality of parallel data streams without reducing the effectiveness of the shuffling process.

Yet another object of the present invention is to provide a digital video signal recording apparatus that reduces the effect of an error caused by a head lock, a tape scratch, or the like in one of two record channels.

In accordance with an aspect of this invention, a digital video signal recording apparatus comprises serial-to-parallel converting means for converting an input digital video signal representing an image to M data streams and for selectively supplying said M data streams as N data streams, M being a multiple of N, the M data streams each representing a vertical strip or a horizontal strip of the image. The data streams are respectively shuffled, encoded and frame segmented to produce record data for recording on a plurality of tracks of a recording medium.

Since the N data streams each include some of the M data streams representing different portions of the image, the shuffling process is effective at dispersing errors which occur during recording or reproducing of the record data.

In accordance with another aspect of the present invention, a digital video signal apparatus comprises serial-to-parallel converting means for converting an input digital video signal to first, second and third data streams, which are shuffled, encoded and frame segmented. The first data stream and a first portion of the second data stream are converted to a first record channel, and the third data stream and a second portion of the second data stream are converted to a second record channel.

Since the sequence of the data streams of each record channel is predetermined, the image quality of data reproduced in a variable speed reproducing mode can be improved.

The above, and other objects, features and advantages of the present invention will be apparent in the following detailed description of the preferred embodiments of the present invention when read in conjunction with the accompanying drawings in which corresponding parts are identified by the same reference numeral.

BRIEF DESCRIPTION OF THE DRAWINGS

FIG. 2 is a table used in explaining a digital HD signal used with the present invention;

FIGS. 6–8 are schematic diagrams respectively showing ways of dividing a serial data stream into a plurality of data streams;

FIG. 13 is a block diagram showing a circuit used for forming the data in encoded blocks into two channels for recording;

FIGS. 14A–14J are timing charts used in explaining the operation of the circuit shown in FIG. 13;

DETAILED DESCRIPTION OF THE PREFERRED EMBODIMENTS

Figure 1:
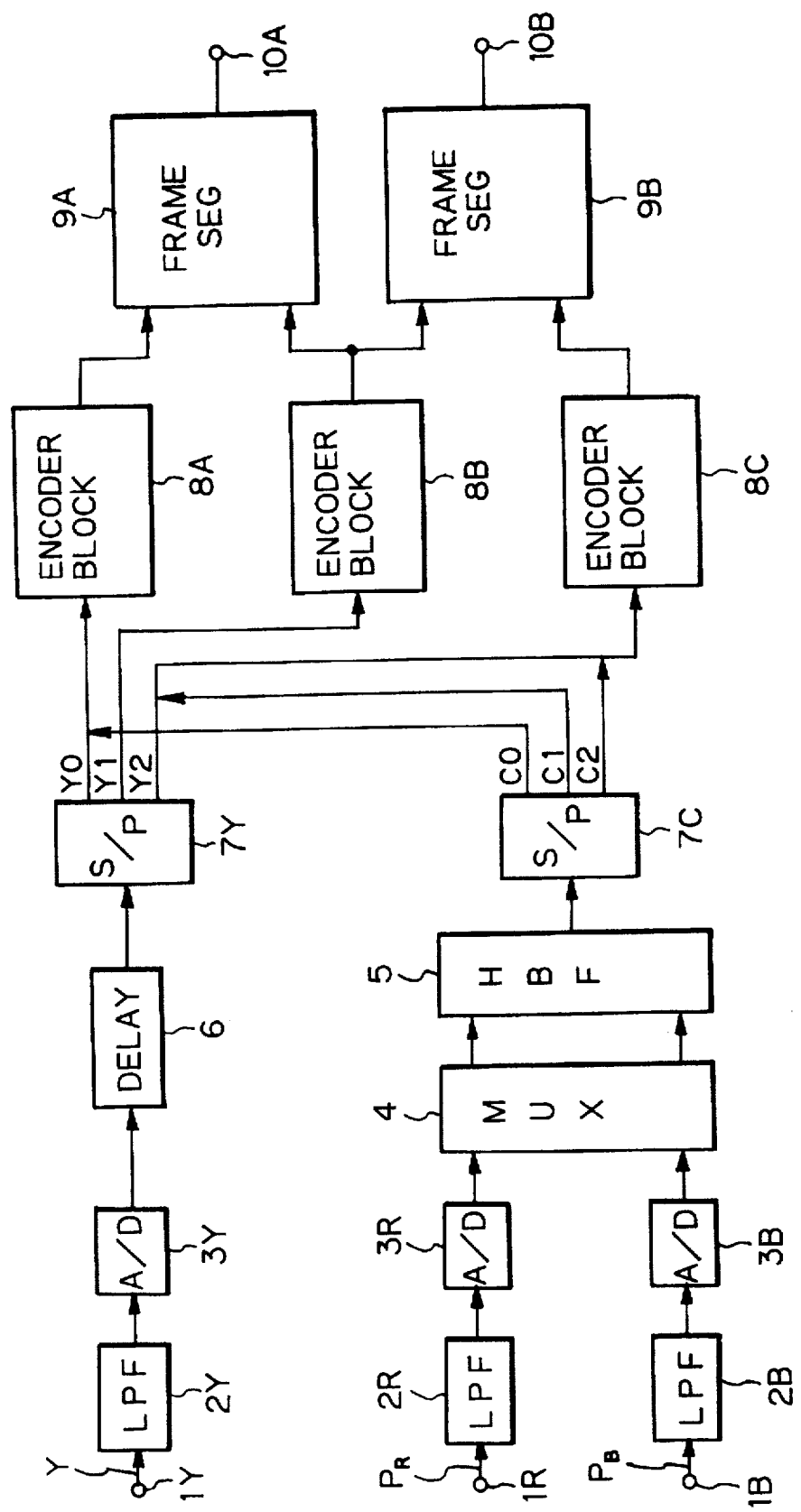
FIG. 1 is a block diagram showing a digital video signal recording apparatus according to the present invention.

A digital video signal recording apparatus according to the present invention divides a serial data stream representing an original video signal into a M parallel data streams, where M is a multiple of N, and then selects every Nth of the data streams to form N collected data streams.

For example, as explained in detail below, a serial data stream may be divided into 72 parallel data streams (M=72) which are formed into three collected data streams (N=3), a first collected data stream consisting of (stream 1, stream 4, stream 7 . . . stream 70), a second collected data stream consisting of (stream 2, stream 5, stream 8 . . . stream 71), and a third collected data stream consisting of (stream 3, stream 6, stream 9 . . . stream 72).

Each of the collected data streams is then separately shuffled and encoded by block segmentation, orthogonal transformation, variable length coding and a buffering process. Thus, in the present invention, the shuffling process is performed for a collected stream representing strips selected across an entire image, preserving the effectiveness of the shuffling in dispersing burst errors. In contrast, a shuffling process performed according to a conventional technique is limited to a contiguous 1/N portion of the image which reduces the effectiveness of the shuffling.

A digital video signal recording apparatus according to the present invention also converts the N collected data streams into a different number of recording channels. For example, if there are three collected data streams and two recording channels, in one embodiment, the first collected data stream and half of the second collected data stream form the first recording channel, while the other half of the second collected data stream and the third collected data stream form the second recording channel. In another embodiment, half of each of the first, second and third collected data streams form the first recording channel, while the other half of each of the first, second and third collected data streams form the second recording channel.

Referring now to the drawings, and in particular to FIG. 1, there is illustrated a digital video signal recording apparatus according to the present invention. The apparatus illustrated in FIG. 1 comprises input terminals 1Y, 1R, 1B, low pass filters 2Y, 2R, 2B, analog to digital (A/D) converters 3Y, 3R, 3B, multiplexer 4, thin out filter 5, delay 6, serial to parallel (S/P) converters 7Y, 7C, encoders 8A, 8B, 8C, frame segmenting circuits 9A, 9B and output terminals 10A, 10B.

Components Y, $P_R$ and $P_B$ of a HD video signal are supplied to input terminals 1Y, 1R and 1B, respectively, which apply these component signals to low pass filters 2Y, 2R and 2B, respectively. The low pass filters 2Y, 2R and 2B are each adapted to band limit the signal supplied thereto to produce an output signal and to supply this output signal to A/D converters 3Y, 3R and 3B, respectively. The A/D converters 3Y, 3R and 3B each serve to digitize the analog signal supplied thereto and to output respective digitized HD component signals.

In this embodiment, an 1125/60 system, sometimes referred to as a high vision system, and a 1250/50 system, sometimes referred to as an HD-MAC system, are described. Characteristics of these systems are shown in FIG. 2. A sampling frequency must be S times higher than a horizontal line frequency (where S is any whole number) because sampling positions are disposed in a two-dimensional grid shape. As a trade-off between signal band and information amount after sampling, the sampling frequency for the luminance Y signal is selected to be 44.55 MHz in the 1125/60 system, and 45.0 MHz in the 1250/50 system. The sampling frequency for each of the color signals is selected to be half of the sampling frequency of the luminance signal, namely 22.275 MHz in the 1125/60 system, and 22.5 MHz in the 1250/50 system.

The A/D converter 3Y supplies the digitized luminance signal to a delay 6 which is operable to delay the digitized luminance signal while the corresponding color components are processed, and then to supply the delayed luminance component signal to a S/P converter 7Y.

The A/D converters 3R, 3B respectively supply the digitized color components to a multiplexer 4 which is adapted to convert the color components into a line sequential signal and to supply this signal to a thin-out filter 5 which serves to perform a ½ thin-out process, that is, to eliminate every other digitized sample, and to supply the thinned-out color component signals to a S/P converter 7C.

The S/P converter 7Y is adapted to convert the serial data stream to a multiple of N data streams, and to output these data streams as N collected data streams to encoders 8A, 8B, 8C. In this example, N has a value of three (N=3), and the collected data streams are referred to as signals Y0, Y1, and Y2.

The S/P converter 7C is adapted to convert the serial data stream to a multiple of N data streams, and to output these data streams as N collected data streams to the encoders 8A, 8B, 8C. In this example, N=3 and the collected data streams are referred to as signals C0, C1, and C2.

Thus, the data clock rate of the collected data streams Y0, Y1, Y2, C0, C1, C2 is decreased to 1/N times the data clock rate of the digitized component signals.

The serial-to-parallel conversion performed by the S/P converters 7Y and 7C is an important aspect of the present invention, and is described in detail below.

The encoders 8A, 8B, 8C may have the same construction as encoders used for encoding an SD signal. Each encoder serves to convert the signal supplied thereto into blocks of 8×8 pixel data.

Figure 3A:
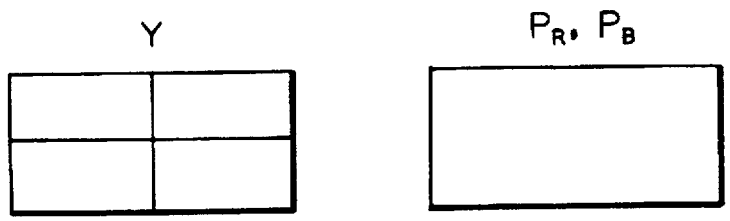
FIGS. 3A–3C are schematic diagrams illustrating a macroblock and the pixel blocks in an image represented in the 1125/60 system.
Figure 3B:
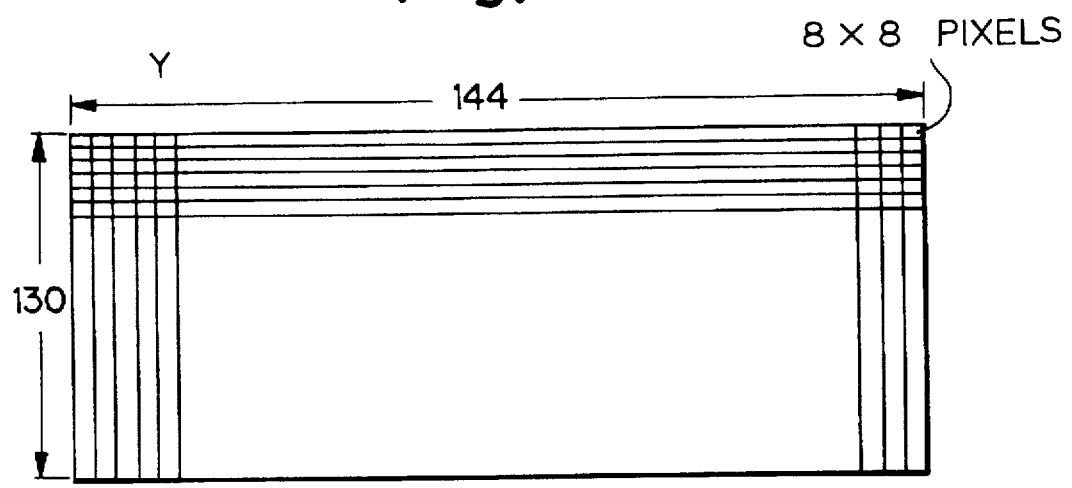

As shown in FIGS. 3A and 3B, a macroblock consists of six blocks, namely, four luminance Y blocks, one color component $P_R$ block and one color component $P_B$ block, which are present in the same spatial position in an image.

Figure 3C:
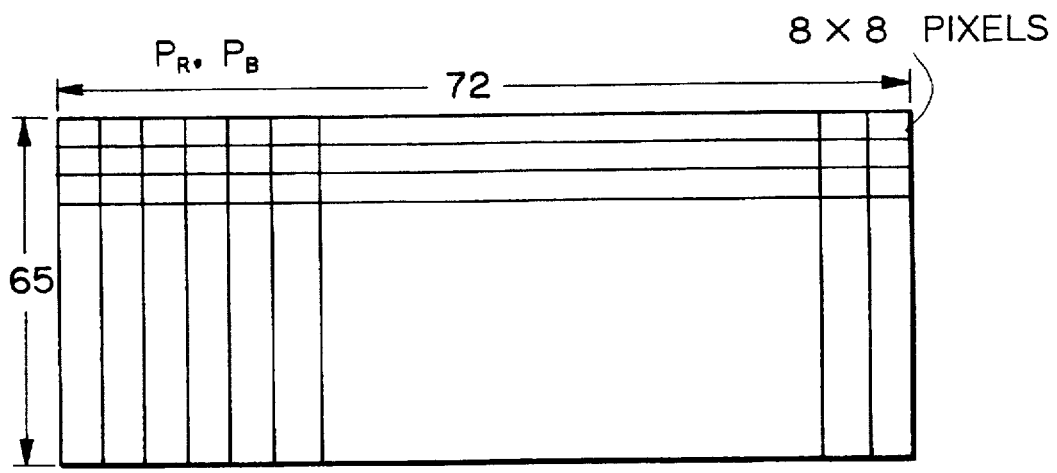
Figure 4A:
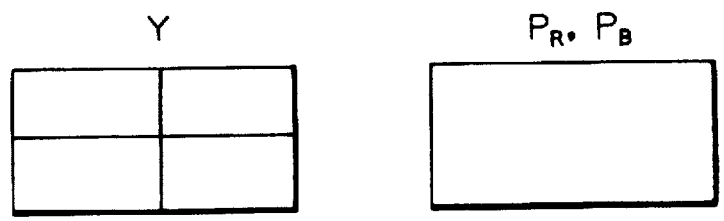
FIGS. 4A–4C are schematic diagrams illustrating a macroblock and the pixel blocks in an image represented in the 1250/50 system.
Figure 4B:
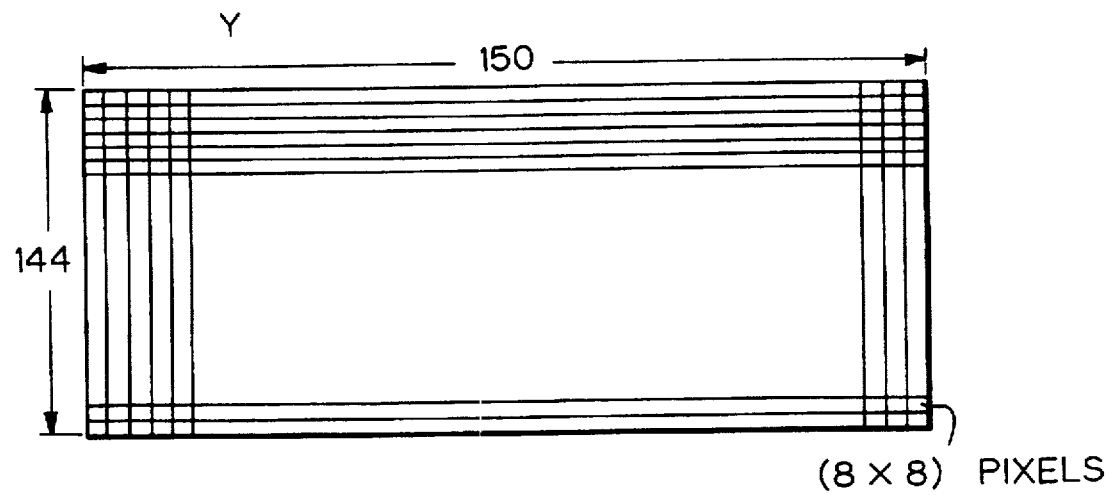
Figure 4C:
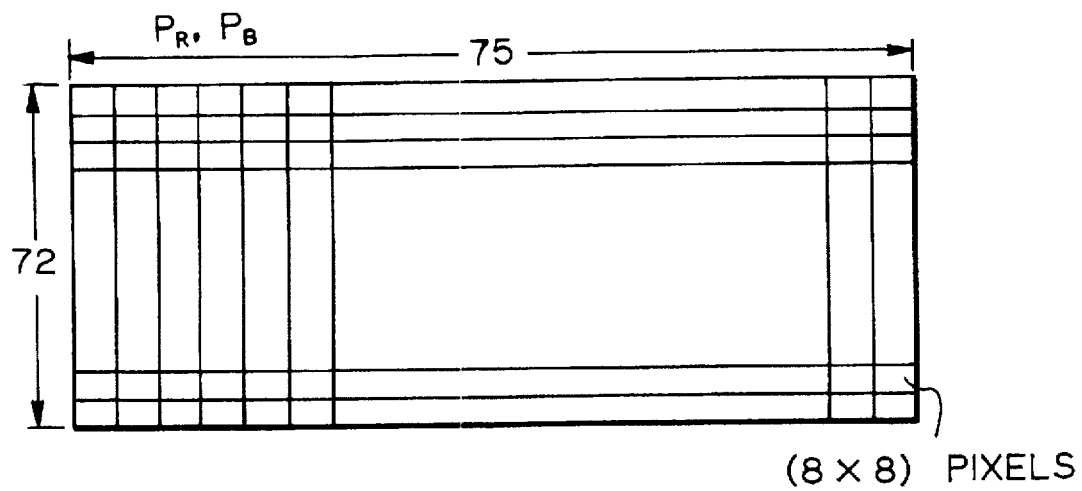

FIG. 3B shows an effective portion of a frame in the 1125/60 system, that is, the luminance signal representing 8×8 blocks of sampled pixels but excluding blanking information, synchronization information and so forth. FIG. 4B shows the luminance Y pixel blocks in an effective portion of a frame in the 1250/50 system. FIGS. 3C and 4C show the pixel blocks for each of the color components $P_R$, $P_B$ in the 1125/60 system and 1250/50 system, respectively. The number of macroblocks per frame is seen to be:

72×65=4680 (1125/60 system)

75×72=5400 (1250/50 system)

Each of the encoders 8A, 8B, 8C also serves to shuffle the pixel blocks, orthogonally transform the pixel blocks to produce 8×8 blocks of coefficient data, quantize the coefficient data and variable length encode the quantized coefficient data, as described in detail below. Each encoder serves to generate data for recording, such as DC coefficient component data, variable length encoded AC coefficient data, quantizing numbers QNo, motion flags, and activity code data, and to supply this data to frame segmenting circuits 9A, 9B.

Each of the frame segmenting circuits 9A, 9B is operable to perform error correction encoding, to convert the record data into frame data, and to perform a track shuffling process. The circuits 9A, 9B supply the frame data, also referred to as channels of record data, to output terminals 10A, 10B, respectively, which apply the record data to two rotary heads through respective channel encoding circuits and respective recording amplifiers for recording on a magnetic tape.

The rotary heads are adjacently disposed and function to simultaneously form two tracks on the magnetic tape. Data representing one frame is recorded in a plurality of tracks, ten tracks in the 525/60 (SD) system, twelve tracks in the 625/50 (SD) system, twenty tracks in the 1125/60 (HD) system, and twenty-four tracks in the 1250/50 (HD) system.

Figure 5:
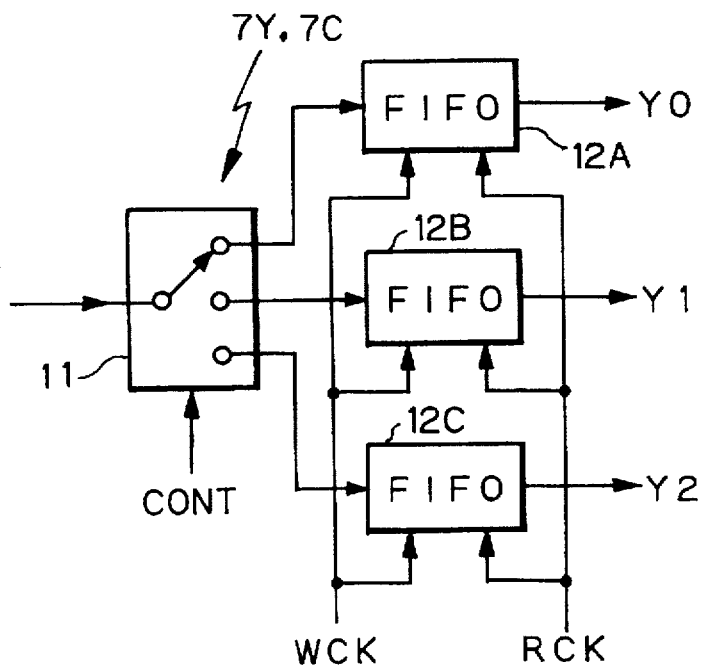
FIG. 5 is a block diagram of a serial-to-parallel converter which may be used in the present invention.

FIG. 5 shows an example of the S/P converters 7Y, 7C, that is, these converters may have the same circuit construction. Each S/P converter includes a demultiplexer 11 and first in first out (FIFO) memories 12A, 12B, 12C.

A luminance or color component signal is supplied to a demultiplexer 11 which is adapted to supply pixels of the component signal to one of FIFOs 12A, 12B, 12C in accordance with a control signal CONT. The control signal serves to allocate portions of the component signal to each of the collected data streams.

A write clock WCK and a read clock RCK are supplied to each of the FIFO memories 12A, 12B, 12C. The frequency of the read clock RCK is 1/N times the frequency of the write clock WCK. The outputs of the FIFO memories 12A, 12B, 12C are the collected data streams Y0, Y1, Y2 having a time base expanded by N, and having a clock rate decreased to 1/N relative to the signal supplied to the demultiplexer 11.

The operation of the S/P converters 7Y, 7C will now be described.

Figure 7:
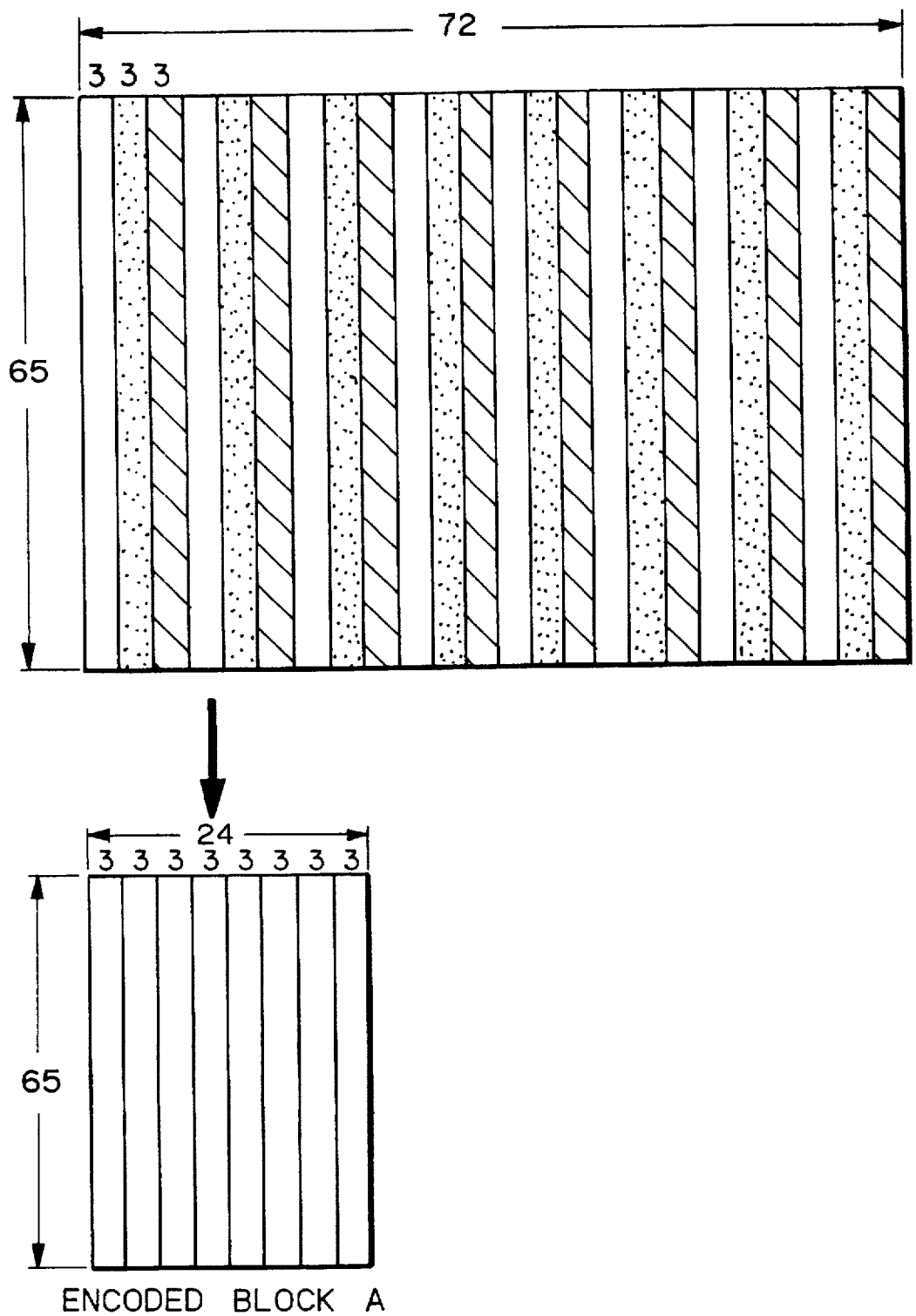
Figure 8:
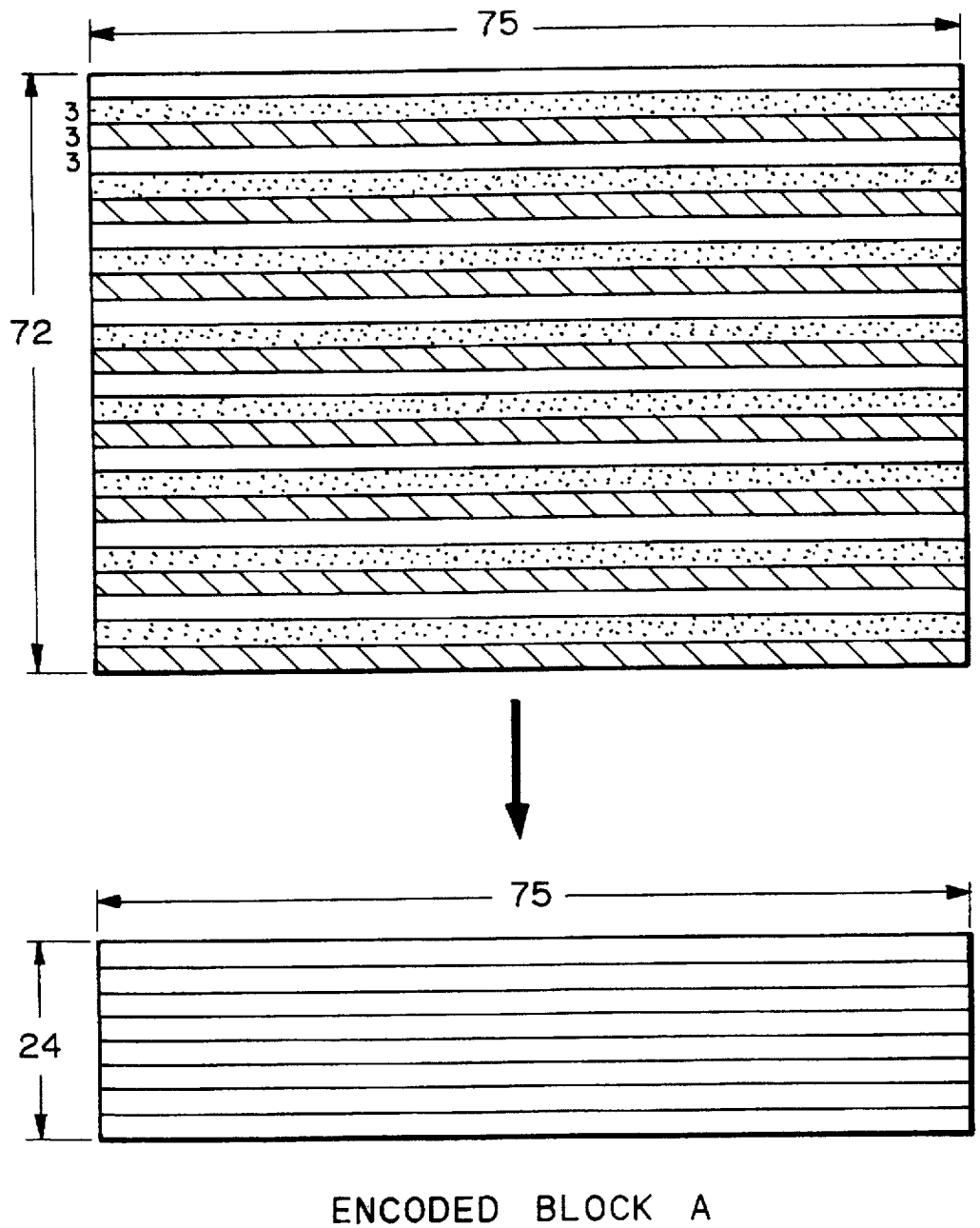

FIGS. 6 and 7 show examples of forming a 1125/60 signal into collected data streams. FIG. 8 shows an example of forming a 1250/50 signal into collected data streams. As explained above, a frame of a 1125/60 signal includes 72×65 macroblocks, and a frame of a 1250/50 signal includes 75×72 macroblocks.

FIG. 6 shows each image line of the input serial data stream divided into 72 parallel data streams each containing one macroblock, that is, each data stream is of size 1×65 macroblocks. The parallel data streams are formed into three (N=3) collected data streams, a first collected data stream A consisting of (stream 1, stream 4, stream 7 . . . stream 70), a second collected data stream B consisting of (stream 2, stream 5, stream 8 . . . stream 71), and a third collected data stream C consisting of (stream 3, stream 6, stream 9 . . . stream 72).

Alternatively, the serial data stream may be considered as divided into 24 data streams of size 3×65 macroblocks each containing a set of (A, B, C) macroblocks, then the A macroblocks from each of the 24 data streams are collected to form the first collected data stream, and the B and C macroblocks are respectively collected to form the second and third collected data streams.

The collected data streams each contain 24×65=1560 macroblocks, and are respectively supplied to the encoders 8A, 8B, 8C shown in FIG. 1.

FIG. 7 shows each image line of the input serial data stream divided into 24 parallel data streams each containing three macroblocks, that is, each data stream is of size 3×65 macroblocks. The parallel data streams are formed into three (N=3) collected data streams, a first collected data stream consisting of (stream 1, stream 4, stream 7 . . . stream 22), a second collected data stream consisting of (stream 2, stream 5, stream 8 . . . stream 23), and a third collected data stream consisting of (stream 3, stream 6, stream 9 . . . stream 24).

Alternatively, the serial data stream may be considered as divided into 8 data streams of size 9×65 macroblocks each containing a set of (A, A, A, B, B, B, C, C, C) macroblocks, then the A macroblocks from each of the 24 data streams are collected to form the first collected data stream, and then the B and C macroblocks are respectively collected to form the second and third collected data streams.

The collected data streams each contain 24×65=1560 macroblocks, and are respectively supplied to the encoders 8A, 8B, 8C shown in FIG. 1.

In the 1250/50 system, the number of macroblocks in the horizontal direction, 75, is not a multiple of three (N=3), but the number of macroblocks in the vertical direction, 72, is a multiple of three. Thus, as shown in FIG. 8, the input serial data stream is divided into 24 parallel data streams each containing three macroblocks across an entire line of the image, that is, each data stream is of size 75×3 macroblocks.

The parallel data streams are formed into three (N=3) collected data streams, a first collected data stream consisting of (stream 1, stream 4, stream 7 . . . stream 22), a second collected data stream consisting of (stream 2, stream 5, stream 8 . . . stream 23), and a third collected data stream consisting of (stream 3, stream 6, stream 9 . . . stream 24).

Alternatively, the serial data stream may be considered as divided into 8 data streams of size 75×9 macroblocks each containing a set of (A, A, A, B, B, B, C, C, C) macroblocks across an entire line of the image, then the A macroblocks from each of the 24 data streams are collected to form the first collected data stream, and then the B and C macroblocks are respectively collected to form the second and third collected data streams.

The collected data streams each contain 75×24=1800 macroblocks, and are respectively supplied to the encoders 8A, 8B, 8C shown in FIG. 1.

As explained, the encoders 8A, 8B, 8C shuffle the collected data streams respectively supplied thereto. Since each collected data stream represents portions spread across the entire image, the shuffling process is effective at dispersing burst errors. In other words, an error occurring during recording or reproducing will be divided and spread across the entire image after the blocks are deshuffled so that the error is less noticeable. Thus, the information amount in each buffering unit is effectively averaged.

In FIGS. 6–8, the example of N=3 collected data streams was illustrated. It will be understood that N may be any integer value, that is, the serial data stream may be converted into any number of parallel data streams.

Figure 9:
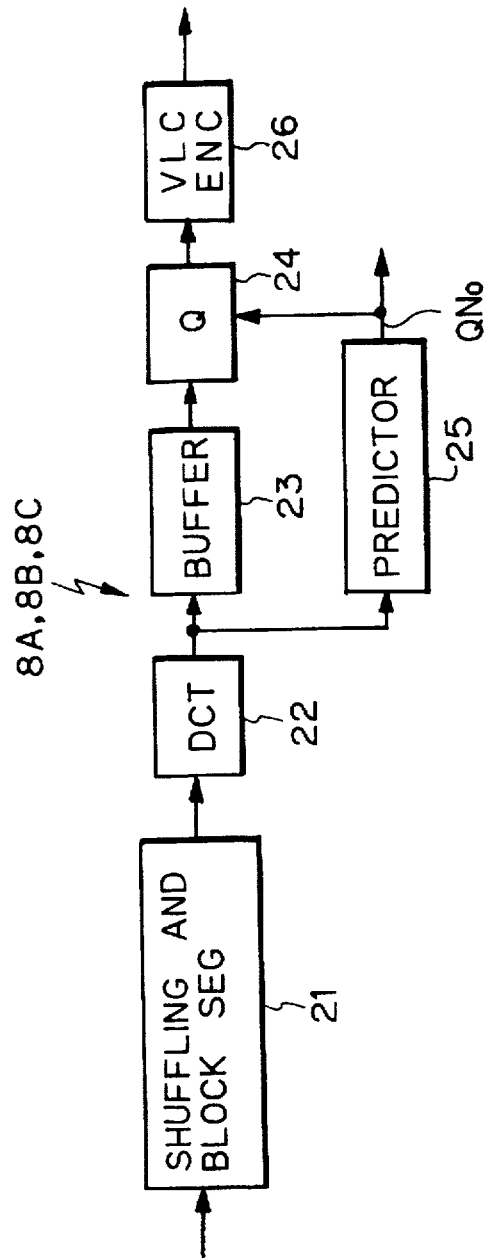
FIG. 9 is a block diagram of an encoder which may be used in the present invention.

FIG. 9 shows an example of the encoders 8A, 8B and 8C, that is, these encoders may have the same circuit construction. Each encoder includes a blocking and shuffling circuit 21, a DCT circuit 22, a buffer 23, a quantizer 24, a predictor 25 and a variable length code (VLC) encoder 26.

A collected data stream is supplied to the blocking and shuffling circuit 21 which is adapted to convert video data in interlace scanning sequence to blocks of 8×8 pixel data, to shuffle the order of these blocks, corresponding to changing the spatial position of the pixel data, and to supply shuffled blocks of pixel data to a DCT circuit 22. The shuffling process is described further below.

The DCT circuit 22 functions to orthogonally transform the blocks of pixel data supplied thereto into 8×8 blocks of coefficient data which each contain a DC component and AC components. The DCT circuit 22 supplies the DC component DC of the 8×8 coefficient data directly to one of the frame segmenting circuits shown in FIG. 1 without compression. The DCT circuit 22 supplies the remaining 63 AC components to a buffer 23 and a predictor 25 in a zigzag scanning sequence from low frequency components to high frequency components.

The encoder shown in FIG. 9 is adapted to orthogonally transform the pixels into coefficients in accordance with whether each pixel data block corresponds to a still image or an image representing motion. This is not described further as it is not an important part of the present invention.

The predictor 25 serves to determine a proper quantizing number QNo for the AC coefficients in each block, and to supply the determined number QNo to a quantizer 24 and to one of the frame segmenting circuits shown in FIG. 1. More specifically, the predictor 25 uses a Huffman table to generate data representing the number of bits which would result from encoding the coefficient data using a variety of quantizing step widths, and provides the quantizing number QNo indicating the quantizing step width most effective for compressing the coefficient data.

The buffer 23 serves to delay the coefficient data until the predictor 25 has determined the proper quantizing number QNo, and to supply the delayed coefficients for each block to the quantizer 24 and to one of the frame segmenting circuits shown in FIG. 1.

The quantizer 24 is operable to quantize the AC components in each block of coefficient data. More specifically, the quantizer 24 divides each AC component coefficient by a quantizing step and truncates the quotient to a whole number to produce quantized coefficient data. The quantizing step is chosen in accordance with the quantizing number QNo supplied from the predictor 25. The quantizer 24 supplies the quantized coefficient data to a VLC encoder 26.

The VLC encoder 26 is adapted to encode the quantized coefficient data using a variable length code such as a run length code or a Huffman code. More specifically, the VLC circuit 26 performs two-dimensional Huffman encoding which generates a variable length code (encoded output) containing run lengths (numbers of consecutive zero value coefficient data) and values of non-zero coefficient data using a Huffman table stored in a read only memory (ROM) which is the same as the Huffman table used by the predictor 25. The VLC circuit 26 supplies the encoded AC coefficients to one of the frame segmenting circuits shown in FIG. 1.

The encoder shown in FIG. 9 is adapted to vary the quantizing step in accordance with the resolution (activity) of each block, and the degree (frequency) of the coefficient data. This is not described further as it is not an important part of the present invention.

The encoder shown in FIG. 9 also is adapted to perform a buffering process in which the quantizing step is controlled so that the amount of data for each buffering unit is within a predetermined value. The buffering process is necessary to ensure that the amount of encoded data, which depends on the image, fits within the predetermined number of tracks allocated to each field representing the image. The amount of encoded data is controlled in buffering units, rather than for each field or frame, to reduce the amount of memory required and to simplify the circuit construction in the digital video signal recording apparatus shown in FIG. 1.

The buffering unit is chosen to be five sync blocks in accordance with a conventional recording apparatus, which corresponds to 52 blocks in the 1125/60 system, and 50 blocks in the 1250/50 system. The number of blocks in each buffering unit is obtained as follows.

When conventional SD hardware is used, 135 sync blocks of compressed coefficient data are recorded in each track. As mentioned above, 10×2=20 tracks are used for recording each frame in the 1125/60 system, and 12×2=24 tracks are used for recording each frame in the 1250/50 system. The number of sync blocks per frame is seen to be:

135×10×2=2700 sync blocks/frame (1125/60 system)

135×12×2=3240 sync blocks/frame (1250/50 system)

When the conventional SD fixed length buffering unit of five sync blocks is used, the number of pixel blocks per buffering unit is seen to be:

((72×65)/2700)×5×6=52 blocks (1125/60 system)

((75×72)/3240)×5×6=50 blocks (1250/50 system)

Thus, in the 1125/50 system, each buffering unit corresponds to 52 blocks=8 macroblocks+4 pixel blocks, while in the 1250/50 system, each buffering unit corresponds to 50 blocks=8 macroblocks+2 pixel blocks.

The shuffling process performed by the blocking and shuffling circuit 21 will now be described in more detail.

Figure 10:
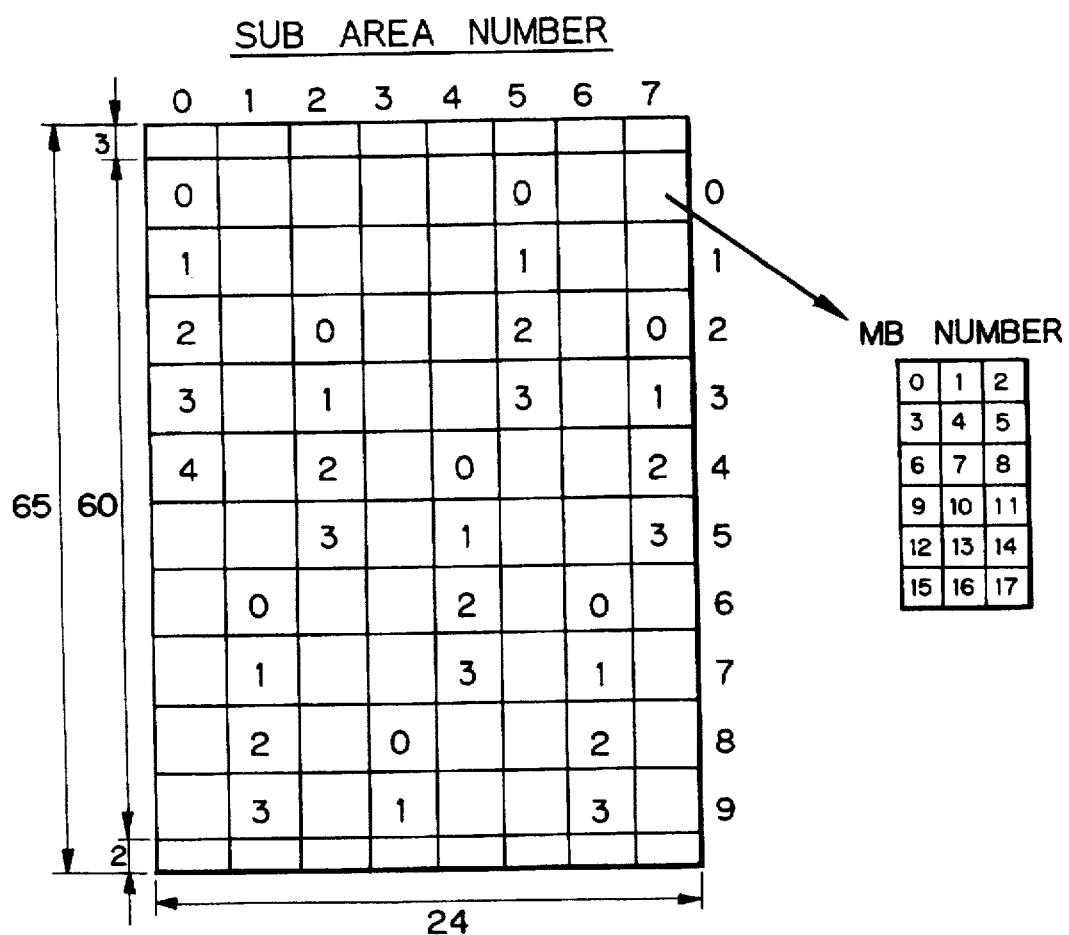
FIG. 10 is a schematic diagram used in explaining a shuffling process.

FIG. 10 shows a data stream of size 24×65 macroblocks, formed as shown in FIGS. 6 or 7 for an 1125/60 system, which is also referred to as an encoded block.

In the horizontal direction, the encoded block is divided into eight portions of three macroblocks each, corresponding to the number of macroblocks in the buffering unit.

In the vertical direction, the encoded block is divided into ten portions of six macroblocks each, corresponding to the number of segments in which data representing one frame in recorded. In the 1125/60 system, a frame is recorded in ten segments each having two tracks for simultaneously recording two channels of data. Additionally, five of the 65 macroblocks in the vertical direction remain available, with three of these macroblocks at the top of the encoded block and two of these macroblocks at the bottom of the encoded block.

Thus, the encoded block is considered as 8×10 sub-portions, with each sub-portion of size 3×6 macroblocks. The macroblocks in each sub-portion are consecutively numbered from 0 to 17, as shown in FIG. 10.

In each column of the encoded block, the ten sub-portions are assigned one of the numbers 0–9 so that the distance between sub-portions bearing the same number in different columns is maximized. That is, the sub-portions in the leftmost column (column 0) are numbered from 0–9 beginning at the top sub-portion. In the next column (column 1), beginning an offset of six sub-portions from the starting point in the previous column (the top sub-portion), the sub-portions are numbered from 0–9. In the next column (column 2), beginning an offset of six sub-portions from the starting point in the previous column, the sub-portions are numbered from 0–9. This process of offsetting and numbering is repeated for the remaining columns.

Shuffling occurs when the macroblocks in the sub-portions are formed into buffering units. Specifically, the macroblocks in each encoded block bearing the same sub-portion number and macroblock number are selected as the macroblocks of respective buffering units. For example, the eight macroblocks (3–16), that is, the respective macroblocks from the eight sub-portions numbered "3" and within each of these sub-portions numbered as "16", form the macroblocks of one buffering unit. The remaining four blocks in each buffering unit are selected from the upper three and lower two rows of macroblocks.

The process illustrated in FIG. 10 is repeated for each of the collected data streams, also referred to as encoded blocks A, B and C, in the case of N=3. Each buffering unit of shuffled pixel data is orthogonally transformed, buffered and variable length encoded, as described above.

The shuffling process produces a shuffled data stream in which spatially non-contiguous portions of the image are adjacent to each other. It is preferred that the image portions which are adjacent to each other in the shuffled data stream are distant from each other in the original image so as to enhance the efficiency of the shuffling process in dispersing burst errors which occur during recording and reproduction.

As mentioned, the buffering unit is chosen to be five sync blocks in accordance with a conventional recording apparatus.

Figure 11:
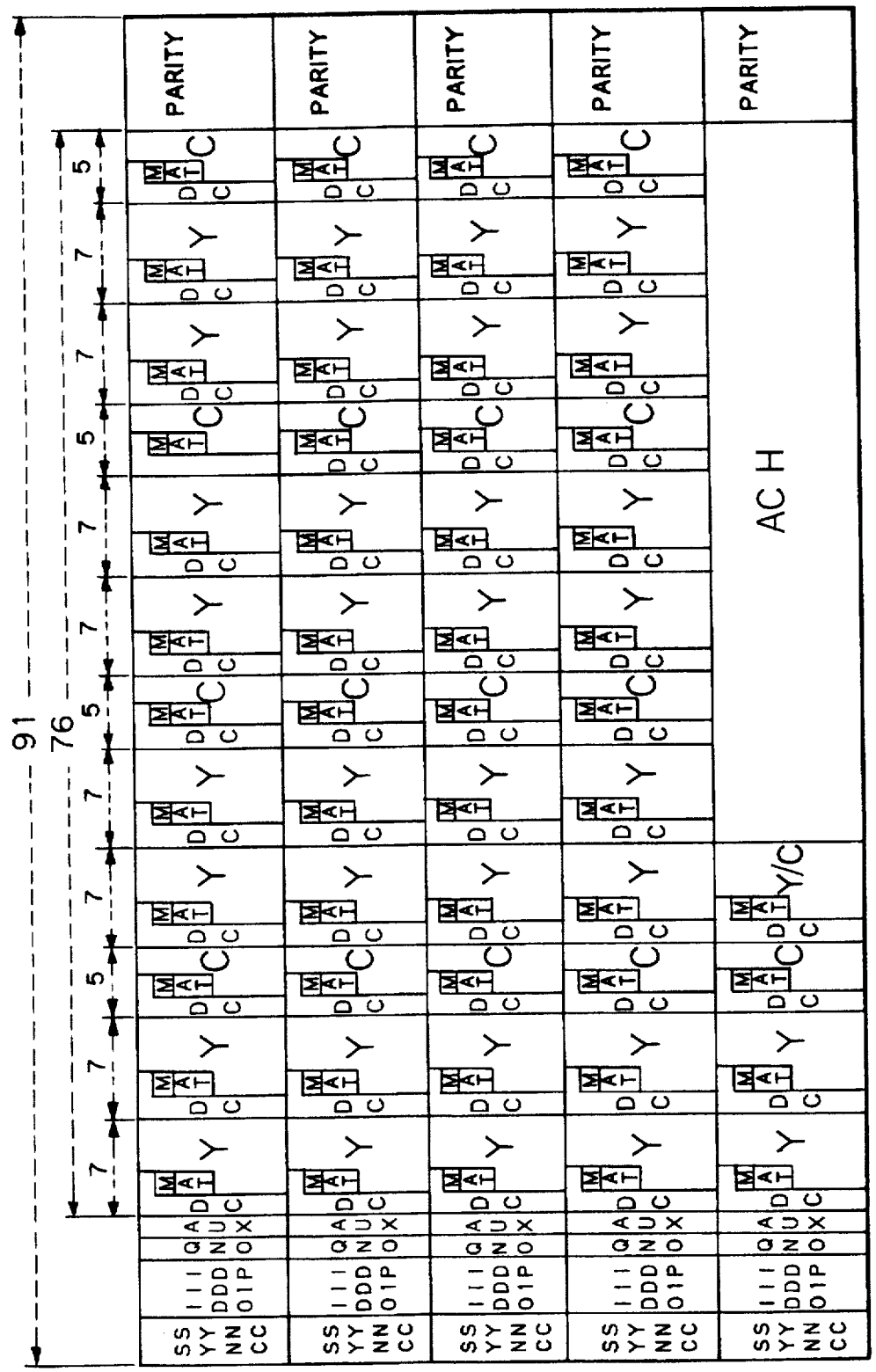
FIG. 11 is a schematic diagram showing five sync blocks in a buffering unit according to the 1125/60 system.
Figure 12:
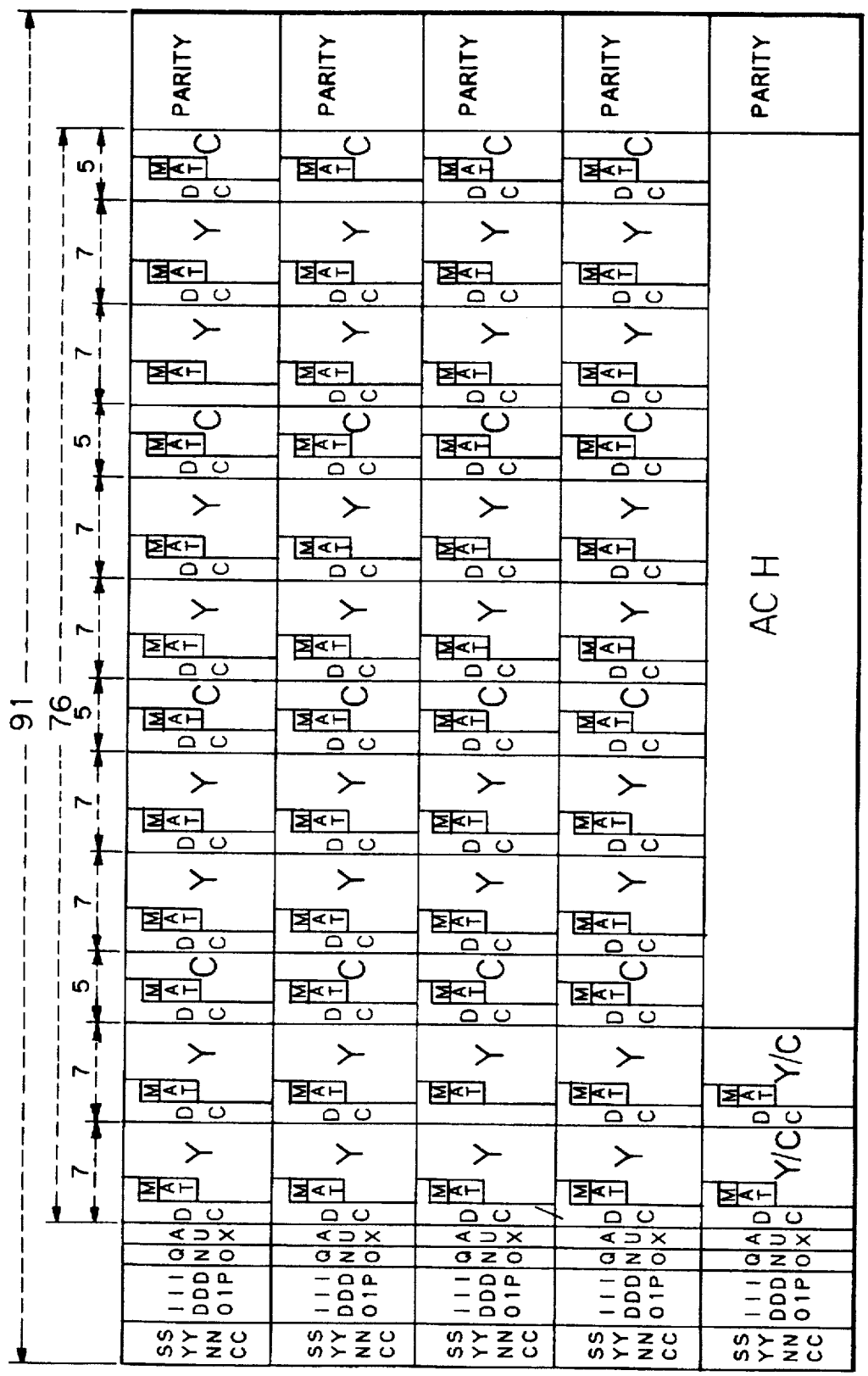
FIG. 12 is a schematic diagram showing five sync blocks in a buffering unit according to the 1250/50 system.

FIGS. 11 and 12 show the five sync blocks in one buffering unit for the 1125/60 and 1250/50 systems, respectively. The length of each sync block is seen to be 91 bytes.

As shown in FIG. 11, in the 1125/60 system, a sync block starts with a block synchronous signal SYNC (two bytes), followed by an ID signal of two bytes ID0, ID1 and one parity byte IDP, followed by one byte for the quantizing number QNO which identifies the quantizing step used to quantize the AC coefficient data, followed by an auxiliary code AUX. Of the remaining bytes, 76 bytes are used for a data region which holds variable length encoded data or outer code parity data, and the last eight bytes hold inner code parity data of a product code.

The data region of 76 bytes is divided into, for example, four portions each of which has 19 bytes. The 19 bytes are further divided into three fixed portions, namely, two 7 byte regions and one 5 byte region. The fixed portions hold a DC component (9 bits) which is generated for each luminance Y or chrominance C DCT block, a motion flag M, and an activity code AT. The other portions hold the zigzag scanned AC coefficient data for the luminance Y or chrominance C DCT blocks. If all data for a block cannot be placed in these portions, the remaining data is stored in an overflow memory. This process is performed for blocks in the buffering unit for each fixed portion of each DCT block.

Next, data stored in the overflow memory is successively placed in the remaining fixed portions and an overflow ACH region at the end of the buffering unit. Since the fixed length unit is 52 data blocks (8 macro blocks+4 blocks), each of four sync blocks in the buffering unit is reserved for a fixed portion of two macroblocks (=12 blocks). The remaining sync block has a fixed portion of four blocks and the overflow ACH region.

As shown in FIG. 12, in the 1250/50 system, data are positioned in generally the same manner as in the 1125/60 system. Since the buffering unit is 50 blocks, each of four sync blocks in the buffering unit is reserved for a fixed portion of two macroblocks (=12 blocks). The remaining sync block has a fixed portion of two blocks and the overflow ACH region.

FIG. 13 shows a circuit included in each of the frame segmenting circuits 9A, 9B of FIG. 1 for controlling the sequence in which the encoded blocks are recorded on a track of a recording medium such as a magnetic tape. The circuit of FIG. 13 includes FIFO memories 31A, 31B, 31C, memories 32A, 32B, 33A, 33B and a switch 35.

The encoded data streams from the encoders 8A, 8B, 8C are input to FIFO memories 31A, 31B, 31C, respectively, at a rate determined by a write clock WCK. The memory 31A is adapted to supply the data stored therein to memories 32A, 32B at a rate determined by a read clock RCK. The memory 31B is adapted to supply the data stored therein to a switch 35 at the rate determined by the read clock RCK. The memory 31C is adapted to supply the data stored therein to memories 33A, 33B at the rate determined by the read clock RCK. The rate of the read clock RCK is twice the rate of the write clock WCK. Thus, the FIFO memories compress the time base of the signals supplied thereto.

The switch 35 is operable to supply the encoded data from the encoder 8B to the memories 32A, 32B, 33A, 33B in accordance with a switching control signal.

The memories 32A and 32B form a two bank random access memory (RAM). Likewise, the memories 33A and 33B form a two bank RAM. In the two-bank type RAM, one bank writes data while the other bank reads data. The memories 32A, 32B, 33A, 33B function to simultaneously output two channels of data, either channels A, B or channels A', B'.

Figure 15:
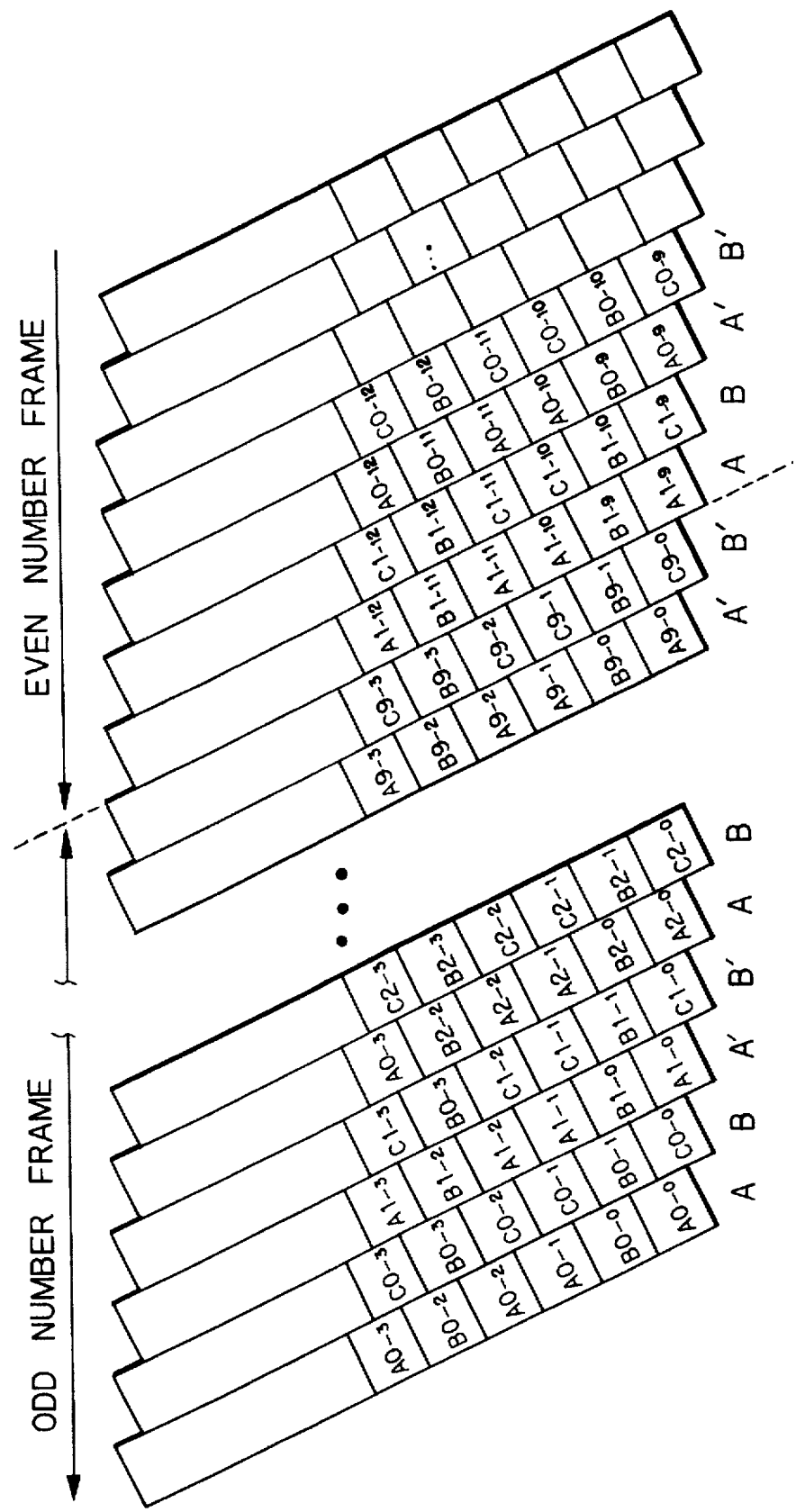
FIG. 15 is a schematic diagram showing a track pattern formed by the circuit shown in FIG. 13 and recorded on a tape according to the 1125/60 system.

FIGS. 14A–14J are timing charts showing the operation of the circuit of FIG. 13, and FIG. 15 shows the tracks formed by the circuit of FIG. 13 at the timing shown in FIGS. 14F, 14J for the 1125/60 system.

As shown in FIGS. 14A, 14B, compressed time base data A, B, A, ... are output from the FIFOs 31A, 31B during two cycles. As shown in FIGS. 14D, 14E these compressed time base data are written into the memories 32A, 32B during the first and second cycles, respectively.

FIGS. 14D, 14E also show the data stored in the memories 32A, 32B being read therefrom with an expanded time base. FIG. 14F shows the sequence of data A, B, A, representing the first, second and first collected data streams, read from the memory 32B in the first cycle then from the memory 32A in the second cycle, to form channel A data.

Similarly, FIGS. 14B, 14C show compressed time base data C, B, C, .... output from the FIFOs 31B, 31C during the two cycles. FIGS. 14G, 14H show these data written into the memories 33A, 33B during the first and second cycles, respectively.

FIGS. 14G, 14H also show the data stored in the memories 33A, 33B being read therefrom with an expanded time base. FIG. 14J shows the sequence of data C, B, C, representing the third, second and third collected data streams, read from the memory 33B in the first cycle then from the memory 33A in the second cycle, to form channel B data.

The leftmost track in FIG. 15 shows the channel A data (A, B, A) recorded therein, while the next track shows the channel B data (C, B, C) recorded therein. The recorded blocks on each track are identified as "L"-"T"-"i", where "L" indicates which of the N=3 encoded blocks (collected data streams) the recorded block corresponds to, "T" indicates which sub-portion the recorded block is from, and "i" indicates which macroblock in the sub-portion the recorded block is from. The sub-portion and macroblock numbering were explained above with reference to FIG. 10. These two tracks containing the channel A and channel B data are simultaneously recorded on the magnetic tape.

Each record block, such as A0–3, shown on the tracks contains the data for one buffering unit. There are 27 record blocks (buffering units) recorded on each track. One frame of the image is recorded in 20 tracks, that is, 10 segments.

Recording the three encoded blocks A, B, C in this sequence improves the quality of reproduced images produced in a variable speed reproducing mode in which data is reproduced at a speed different than a recording speed. In the variable speed reproducing mode, the rotary heads scan the tape over a plurality of tracks, intermittently reproducing data from several adjacent buffering units. Since the encoded blocks A, B, C are recorded at a narrow portion, data at a narrow portion on the screen is reproduced. In the variable speed reproducing mode, the larger the effective data, the more the reproduced quality is improved.

In a track shuffling process, the record block recording sequence is changed as a function of whether the track is from an odd or even numbered frame. This change is performed for each segment (two tracks) or for an offset on one track. More specifically, the data recording sequence on the channels A, B and A', B' of an odd frame is the reverse of the data recording sequence of an even frame. That is, if one track is divided into upper side data and lower side data, an even frame has an offset which is the reverse of that of an odd frame.

The data recording sequence is changed every two tracks to protect against errors such as clogging of a rotary head. For example, the recording apparatus may include opposed double azimuth heads, one double azimuth head for recording channels A and B data and another double azimuth head for recording channel A' and B' data. If one double azimuth head is clogged, and the data sequence were not changed every two tracks, then a fixed portion of the image would not be reproduced. Furthermore, if the tape contains a longitudinal scratch, the offset on each track permits reproduction of fixed portions of the image.

Figure 16:
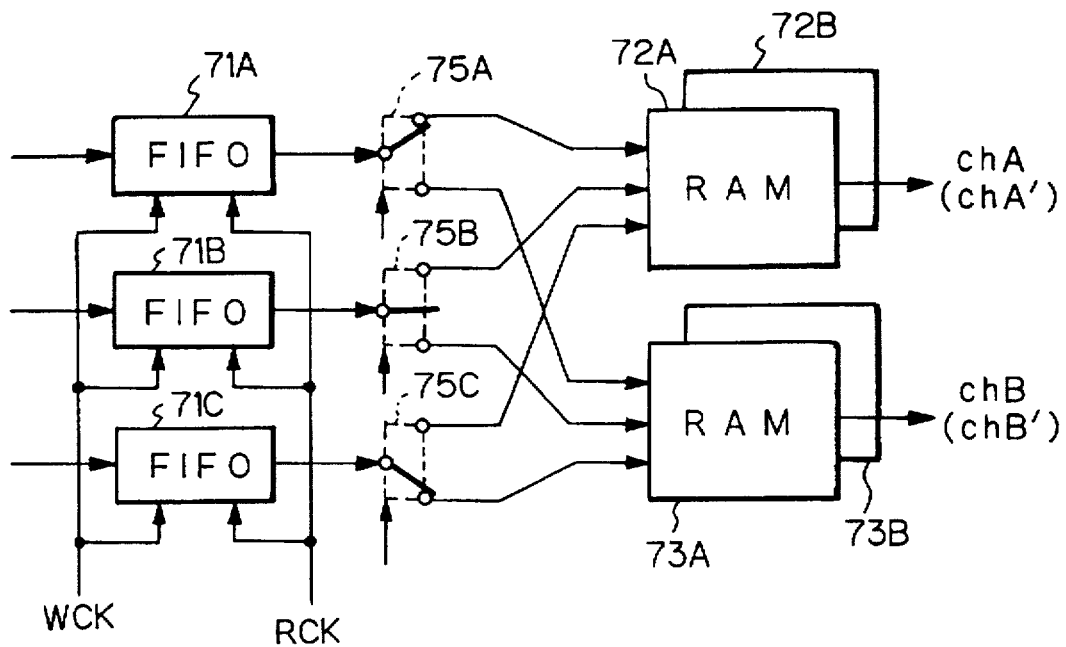
FIG. 16 is a block diagram showing another circuit used for forming the data in encoded blocks into two channels for recording.

FIG. 16 shows another circuit which may be included in each of the frame segmenting circuits 9A, 9B of FIG. 1 for controlling the sequence in which the encoded blocks are recorded on a track of a magnetic tape. The circuit of FIG. 16 includes FIFO memories 71A, 71B, 71C, memories 72A, 72B, 73A, 73B and switches 75A, 75B, 75C.

The encoded data streams from the encoders 8A, 8B, 8C are input to FIFO memories 31A, 31B, 31C, respectively, which generally operate in the same manner as the corresponding elements of FIG. 14, except that each FIFO supplies its output to a switch. The switches 75A, 75B, 75C are shown as having one input and two outputs, or alternatively may have three outputs one of which is connected to ground. The switches are operable to route compressed data from the FIFOs to one of memories 72A, 72B, 73A, 73B in accordance with respective switching control signals. The memories 72A, 72B, 73A, 73B generally operate in the same manner as the corresponding elements of FIG. 14.

Figure 17:
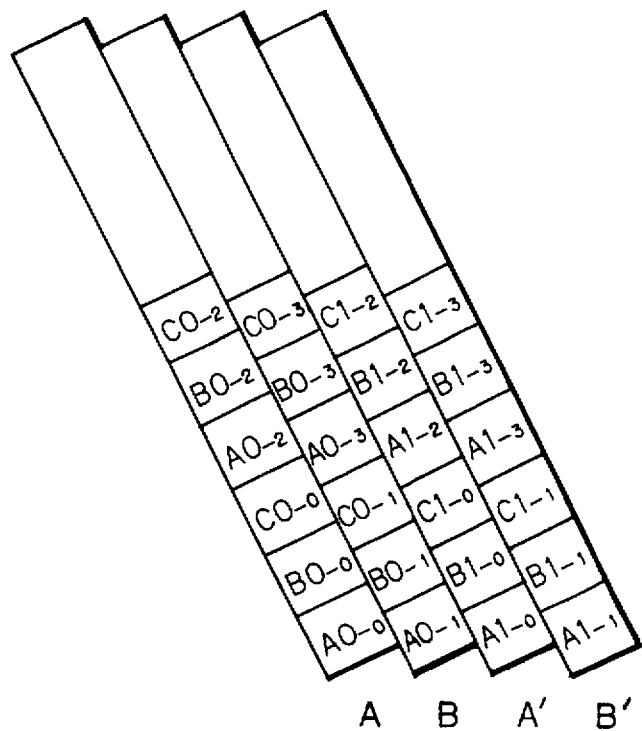
FIG. 17 is a schematic diagram showing a portion of a track pattern formed by the circuit shown in FIG. 16 and recorded on a tape.

FIG. 17 shows the tracks formed by the circuit of FIG. 16. Each track contains data from each of the three encoded blocks (collected data streams) A, B, C. Otherwise, the tracks shown in FIG. 16 are recorded in a generally similar manner as the tracks shown in FIG. 15, including the track shuffling process.

According to the present invention, when one image is divided into a plurality of portions, that is, one serial data stream is converted into a plurality of data streams, collected data stream are formed from data collected across the entire image. Thus, when the pixel data blocks of each collected data stream are shuffled, the effectiveness of the shuffling process is improved relative to a prior art process in which the image was divided into contiguous portions and each contiguous portion was separately shuffled.

In the present invention, when a plurality of encoded blocks are recorded on a tape, the recording sequence is controlled, improving the quality of a reproduced image in a variable speed reproducing mode.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A digital video signal recording apparatus, comprising:

serial-to-parallel converting means for converting an input digital video signal representing an image to M data streams and for selectively supplying said M data streams as N data streams, M>1, N>1, and M/N being an integer greater than 1, said M data streams each representing a vertical strip or a horizontal strip of said image;

means for shuffling said N data streams to produce respective shuffled data streams;

means for encoding each of said shuffled data streams to produce respective encoded blocks; and means for frame segmenting each of said encoded blocks to produce record data for recording on a plurality of tracks of a recording medium.

2. An apparatus as in claim 1, wherein said input digital video signal is a high resolution video signal.

3. An apparatus as in claim 1, wherein said means for shuffling shuffles said N data streams so that adjacent portions of said image are distant from each other in said shuffled data streams.

4. A digital video signal recording apparatus, comprising:
- serial-to-parallel converting means for converting an input digital video signal to first, second and third data streams;
- means for shuffling said first, second and third data streams to produce respective shuffled data streams;
- means for encoding each of said shuffled data streams to produce respective encoded blocks;
- means for frame segmenting each of said encoded blocks to produce record channels for recording on a plurality of tracks of a recording medium, including means for converting the encoded blocks representing said first data stream and a first portion of said second data stream to a first record channel and for converting the encoded blocks representing said third data stream and a second portion of said second data stream to a second record channel.

5. An apparatus as in claim 4, wherein said input digital video signal is a high resolution video signal.

6. An apparatus as in claim 4, wherein said means for frame segmenting periodically changes a sequence of segmenting said encoded blocks into said record channels.

7. An apparatus as in claim 4, wherein said first record channel includes data in a sequence representing said first data stream, said second data stream and said first data stream; and said second record channel includes data in a sequence representing said third data stream, said second data stream and said third data stream.

8. A digital video signal recording apparatus, comprising:
- serial-to-parallel converting means for converting an input digital video signal to first, second and third data streams;
- means for shuffling said first, second and third data streams to produce respective shuffled data streams;
- means for encoding each of said shuffled data streams to produce respective streams of encoded blocks;
- means for frame segmenting each of said streams of encoded blocks to produce a plurality of record channels for recording on a plurality of tracks of a recording medium, including means for routing respective first portions of each of said streams of encoded blocks to one of said channels and for routing respective second portions of each of said streams of encoded blocks to another of said record channels.

9. An apparatus as in claim 8, wherein said input digital video signal is a high resolution video signal.

10. An apparatus as in claim 8, wherein said means for frame segmenting periodically changes a sequence of segmenting said encoded blocks into said record channels.

* * * * *

UNITED STATES PATENT AND TRADEMARK OFFICE
CERTIFICATE OF CORRECTION

PATENT NO. : 5,790,747
DATED : August 4, 1998
INVENTOR(S) : Kanota, et al.

It is certified that error appears in the above-identified patent and that said Letters Patent is hereby corrected as shown below:

Column 14, line 18, after "one of said" insert --record--.

Signed and Sealed this

Second Day of March, 1999

Attest:

Q. TODD DICKINSON

*Attesting Officer*   *Acting Commissioner of Patents and Trademarks*